United States Patent
Luettke et al.

(10) Patent No.: US 12,226,993 B2
(45) Date of Patent: Feb. 18, 2025

(54) RECYCLABLE PACKAGING FILM AND ARTICLE WITH MECHANICALLY PRE-SLIT CONTROLLED TEAR LINE

(71) Applicant: ProAmpac Holdings Inc., Cincinnati, OH (US)

(72) Inventors: Sophia R. Luettke, Cincinnati, OH (US); Seyed Hesamoddin Tabatabaei, Mason, OH (US); Daniel T. Senter, Crestwood, MO (US); Kevin L. Lemmons, Jackson, MO (US); Brian J. Schiermeier, White House, TN (US)

(73) Assignee: ProAmpac Holdings Inc., Cincinnati, OH (US)

( * ) Notice: Subject to any disclaimer, the term of this patent is extended or adjusted under 35 U.S.C. 154(b) by 0 days.

(21) Appl. No.: 17/946,987

(22) Filed: Sep. 16, 2022

(65) Prior Publication Data

US 2023/0100176 A1    Mar. 30, 2023

Related U.S. Application Data

(60) Provisional application No. 63/245,360, filed on Sep. 17, 2021.

(51) Int. Cl.
*B32B 3/24*     (2006.01)
*B32B 1/00*     (2006.01)
(Continued)

(52) U.S. Cl.
CPC .................. *B32B 7/12* (2013.01); *B32B 1/00* (2013.01); *B32B 3/266* (2013.01); *B32B 27/08* (2013.01);
(Continued)

(58) Field of Classification Search
CPC ........ B32B 3/266; B65D 75/12; B65D 75/20; B65D 75/30; Y10S 493/963; Y10S 493/93; Y10T 428/15
(Continued)

(56) References Cited

U.S. PATENT DOCUMENTS 5,141,795 A * 8/1992 Kai ..................... B29C 66/4322
                                                         428/34.3
8,740,458 B2   6/2014 Edwards et al.
(Continued)

FOREIGN PATENT DOCUMENTS

CN    202244482 U    5/2012
EP    2374610 A1    10/2011
(Continued)

OTHER PUBLICATIONS

International Search Report and Written Opinion dated Feb. 16, 2023, received in PCT/US2022/043893.
(Continued)

*Primary Examiner* — William P Watkins, III
(74) *Attorney, Agent, or Firm* — McLane Middleton, Professional Association (57) ABSTRACT

A method of forming a flexible packaging film includes providing a first web including a polymer sealant layer, the first web having a first major surface and a second major surface opposite the first major surface. A second web including a polymer outer layer is provided, the second web having a third major surface and a fourth major surface opposite the third major surface. An adhesive layer is applied to the second major surface and the first web is laminated to the third major surface. Prior to laminating the first web to the second web, one or more slits are formed in the second web.

20 Claims, 8 Drawing Sheets

(51) Int. Cl.

| | | |
|---|---|---|
| *B32B 3/26* | (2006.01) | |
| *B32B 7/12* | (2006.01) | |
| *B32B 27/08* | (2006.01) | |
| *B32B 27/32* | (2006.01) | |
| *B32B 33/00* | (2006.01) | |
| *B32B 37/00* | (2006.01) | |
| *B32B 37/12* | (2006.01) | |
| *B32B 38/00* | (2006.01) | |
| *B32B 43/00* | (2006.01) | |
| *B65D 75/12* | (2006.01) | |
| *B65D 75/20* | (2006.01) | |
| *B65D 75/30* | (2006.01) | |

(52) U.S. Cl.
CPC .............. *B32B 27/32* (2013.01); *B32B 33/00* (2013.01); *B32B 37/0053* (2013.01); *B32B 37/12* (2013.01); *B32B 38/0004* (2013.01); *B32B 38/145* (2013.01); *B32B 43/003* (2013.01); *B32B 2250/02* (2013.01); *B32B 2250/242* (2013.01); *B32B 2255/10* (2013.01); *B32B 2255/26* (2013.01); *B32B 2307/31* (2013.01); *B32B 2307/546* (2013.01); *B32B 2307/7244* (2013.01); *B32B 2307/7265* (2013.01); *B32B 2323/04* (2013.01); *B32B 2439/00* (2013.01); *B65D 75/12* (2013.01); *B65D 75/20* (2013.01); *B65D 75/30* (2013.01); *Y10S 493/93* (2013.01); *Y10S 493/963* (2013.01); *Y10T 428/15* (2015.01)

(58) Field of Classification Search
USPC .......................................................... 428/43
See application file for complete search history.

(56) References Cited

U.S. PATENT DOCUMENTS

| | | | |
|---|---|---|---|
| 11,014,729 | B2 | 5/2021 | Van Landeghem et al. |
| 2002/0113108 | A1 | 8/2002 | Jackson |
| 2003/0235660 | A1 | 12/2003 | Blanchard |
| 2004/0191476 | A1 | 9/2004 | Wallen et al. |
| 2005/0022925 | A1 | 2/2005 | Janssen |
| 2012/0033901 | A1 | 2/2012 | Votaw |
| 2013/0064481 | A1 | 3/2013 | Yamamoto et al. |
| 2014/0185965 | A1 | 7/2014 | Lyzenga |
| 2015/0266663 | A1 | 9/2015 | Joseph et al. |
| 2017/0029193 | A1* | 2/2017 | Ohyama ............ B65D 75/5805 |
| 2020/0290333 | A1 | 9/2020 | Welvaert et al. |

FOREIGN PATENT DOCUMENTS

| | | |
|---|---|---|
| GB | 1476445 A | 6/1977 |
| NL | 7903836 A | 11/1980 |
| WO | 2003031281 | 4/2003 |
| WO | 2005105586 | 11/2005 |

OTHER PUBLICATIONS

JSC Technologia, Packaging film (date unknown).
Machine Translation of CN202244482.
Machine Translation of NL7903836.

* cited by examiner

RECYCLABLE PACKAGING FILM AND ARTICLE WITH MECHANICALLY PRE-SLIT CONTROLLED TEAR LINE

CROSS REFERENCE TO RELATED APPLICATION

This application claim the priority benefit of U.S. provisional application Ser. No. 63/245,360 filed Sep. 17, 2021. The aforementioned application is incorporated herein by reference in its entirety.

BACKGROUND

The present invention relates to packaging and, in particular, to a product packaging construction and method with an easy open feature for flexible film packaging applications, such as quad box pouch applications and others.

Flexible film packaging that has high toughness, i.e., that is able to withstand multiple drops or other stresses that occur during handling and transport, is typically difficult to tear open without some type of opening feature. Such packaging commonly requires the use of scissors, a knife, or other sharp object to open.

Existing packages that do have an opening feature commonly use a tear tape that is added to the flexible film sheet on the packaging line. However, this adds cost and complexity to the package and packaging line.

An opening feature may also be created by scoring, such as mechanical scoring or laser scoring of packaging films, to create a predetermined weakened line in the film which creates a line of preferential tearing. Mechanical scoring of laminated film structures creates issues with respect to controlling the score depth. In addition, it has been found that laser scoring breaches the barrier layer in the existing recyclable films, thus rendering laser scoring unsuitable for packaging for products that are susceptible to moisture and/or oxygen permeation and thus require film packaging that possesses good barrier properties.

Existing packaging films that are both recyclable and have good barrier properties can provide a high degree of toughness but are difficult to open. Similarly, existing recyclable packaging films can be provided with an easy tear feature, however, the easy tear feature tends to compromise one or both of toughness and the barrier properties.

The present disclosure contemplates a new and improved packaging article and film and method therefor that overcome the above-referenced problems and others.

SUMMARY

This disclosure relates to a laminating methods and laminations, e.g., recyclable polyethylene-based film laminations, which can be used to form various pouch formats, such as a quad box pouch, stand up pouch, fold-over bottom quad pouch, etc. The pouches herein may advantageously be used as packaging for various items such as food, home care, pet care, or personal care products. The laminations herein have mechanically formed slits in the outer layer applied in the machine direction of the film web, which allows a filled and sealed pouch to be formed of the lamination. The slits are formed in the outer printed ply prior to lamination to produce a line of preferential tearing without breaching the inner barrier and sealant layers. This allows the pouch to be easily torn open by the consumer without compromising the toughness of the film or barrier properties required to keep product fresh and palatable.

By pre-slitting the outermost layer of film, the inside/sealant layer that provides barrier properties remains untouched which prevents moisture and oxygen exchange between the interior of the package and the outside environment, thus allowing food or other products contained within the package to remain fresh. The slit lines along the outside serves as a guide which allows the package to easily be torn open.

The film laminations with score lines formed by perforating the entire thickness of the outer layer prior to the laminating step in accordance with the present disclosure may be used to create flexible packaging films that are formed into various pouch formats, where the thickness, toughness, and types of polyethylene films used would otherwise prevent the package from being able to be torn open. In certain embodiments, the film laminations with pre-slit outer ply herein are well-suited for large-format applications (e.g., wherein the fill weight of the pouch is about 2 pounds or greater), although packaging applications of other sizes are also contemplated.

In one aspect, a method of forming a flexible packaging film comprises providing a first web including a polymer sealant layer and a second web including a polymer outer layer. The first web has a first major surface and a second major surface opposite the first major surface. The second web includes a polymer outer layer, the second web having a third major surface and a fourth major surface opposite the third major surface. An adhesive layer is applied to the second major surface. The first web is laminated to the third major surface. Prior to laminating the first web to the third major surface, one or more slits are formed in the second web, each of said one or more slits perforating the second web.

In a more limited aspect, the step of applying an adhesive comprises feeding the first web in a machine direction past a coater.

In another more limited aspect, the coater is selected from the group consisting of a spray coater, knife coater, roll coater, and slit die coater.

In another more limited aspect, the laminating step comprises feeding the first web and second web to a nip point occurring between a pair of nip rollers.

In another more limited aspect, each of the one or more slits extends in the machine direction.

In another more limited aspect, the one or more slits includes a first slit and a second slit, wherein the first and second slits are configured to be substantially aligned with each other in a packaging article formed from the flexible packaging film.

In another more limited aspect, the second web includes a printed ink layer disposed on the third major surface.

In another more limited aspect, the printed ink layer is a reverse printed ink layer.

In another more limited aspect, the one or more slits are formed using a slitter selected from the group consisting of a razor in air slitter, razor in grooved roll slitter, and a rotary knife shear slitter.

In another more limited aspect, the polymer sealant layer is a recyclable polyethylene sealant layer and the polymer outer layer is a recyclable polyethylene outer layer.

In another further aspect, a method of forming a packaging article includes providing a first web including a polymer sealant layer and a second web including a polymer outer layer. The first web has a first major surface and a second major surface opposite the first major surface. The second web has a third major surface and a fourth major surface opposite the third major surface. An adhesive layer is applied to the second major surface and the first web is laminated to the third major surface to form a laminated flexible packaging film. Prior to the laminating step, forming one or more slits are formed in the second web. A first portion of the first major surface is sealed to a second portion of the first major surface to form a hermetically sealed packaging article, wherein the one or more slits form a line of preferential tearing for opening the packaging article.

In a more limited aspect, the sealant layer is heat and/or ultrasonic sealable to itself or a like sealant layer.

In another more limited aspect, the packaging article comprises a body having a front panel, a back panel opposing the front panel, and a bottom panel adjoining the front, back, first side, and second side panels at a bottom end of the body. The front panel and back panel are sealed along a top end of the body opposite the bottom end, the body having a longitudinal axis passing through the top and bottom ends. The front panel, back panel, and bottom panel enclose an interior. The front panel, back panel, and bottom panel are each formed of the laminated flexible packaging film. The one or more slits define a first line of preferential tearing extending transversely across the front panel adjacent the top end. The one or more slits further define a second line of preferential tearing extending transversely across the back panel adjacent the top end, wherein the second score line is substantially aligned with the first score line along the longitudinal axis.

In another more limited aspect, the packaging article further comprises a first side panel intermediate the front and back panels on a first transverse side of the body and a second side panel intermediate the front and back panels on a second transverse side of the body.

In another more limited aspect, the polymer sealant layer is a recyclable polyethylene sealant layer and the polymer outer layer is a recyclable polyethylene outer layer.

In another more limited aspect, the polymer outer layer includes a moisture and oxygen permeation barrier.

In another more limited aspect, the barrier is formed of EVOH and the laminated flexible packaging film has an oxygen transmission rate (OTR) in the range of between 0.05 cc/100 in$^2$/24 hr and 0.25 cc/100 in$^2$/24 hr at 23° C. and 0% relative humidity.

In another more limited aspect, the first web includes a first polyethylene-based layer attached to an inward facing surface of the first web, a second polyethylene-based layer forming an innermost surface of the laminated flexible packaging film, and a barrier layer disposed intermediate the first and second polyethylene-based layers.

In another more limited aspect, the first web further includes a first tie layer disposed intermediate the first polyethylene-based layer and the barrier layer and a second tie layer disposed intermediate the second polyethylene-based layer and the barrier layer.

In a further aspect, a flexible packaging film and packaging article are provided.

One advantage of the present development is that it provides an easy open feature without the need to apply a tear tape strip to the film.

Still another advantage of the present development is that the package apparatus formed in accordance with the present disclosure can be opened by the end user without the use of a knife or other sharp object.

Another advantage of the present development is that a recyclable packaging article can be provided that is easy to open and has a high degree of toughness while also retaining good moisture and oxygen barrier properties.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings, wherein like reference numerals refer to like or analogous components throughout the several views, and which are not intended to be drawn to scale, are only for purposes of illustrating preferred embodiments and are not to be construed as limiting the invention.

DETAILED DESCRIPTION OF THE PREFERRED EMBODIMENT(S)

The terms "a" or "an," as used herein, are defined as one or more than one. The term "another," as used herein, is defined as at least a second or more. The terms "including" and/or "having" as used herein, are defined as comprising (i.e., open transition). As used herein, the terms "joined," "coupled," "operatively coupled," and the like, are defined as indirectly or directly connected, unless specifically stated otherwise.

All numbers herein are assumed to be modified by the term "about," unless stated otherwise. The recitation of numerical ranges by endpoints includes all numbers subsumed within that range (e.g., 1 to 5 includes, inter alia, 1, 1.5, 2, 2.75, 3, 3.80, 4, and 5).

Figure 1:
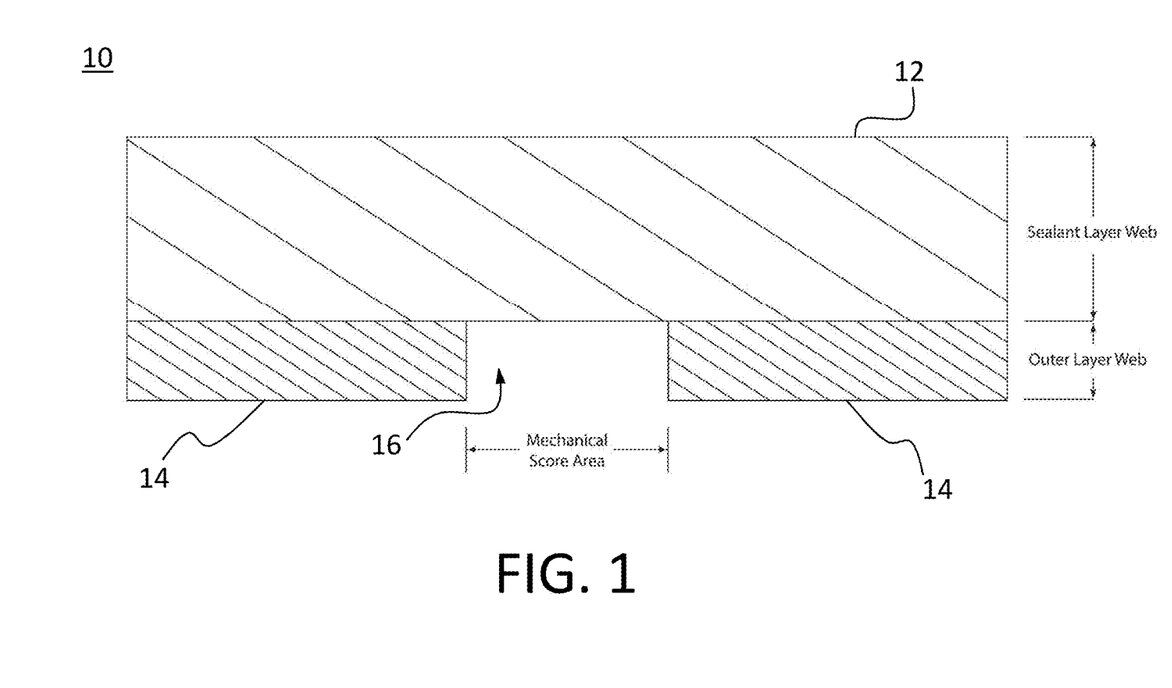
FIGS. 1-3 are cross-sectional views of packaging film laminations in accordance with exemplary embodiments.

Referring now to FIG. 1, there appears a recyclable polyethylene film construction 10, which is operable to embody the present invention. As used herein, the term "recyclable" may refer to a product that is compatible with polyethylene collection streams, including materials that comply with one or more promulgated standards or guidelines for recyclability, and including materials that are sufficiently free of other materials, such as polyethylene terephthalate (PET), polyvinyl chloride (PVC), polyvinylidene chloride (PVDC), paper, aluminum foil, and other materials which would impede recyclability. The term polyethylene-based with respect to a film or layer means it is formed primarily of polyethylene homopolymers, copolymers, or terpolymers wherein the quantity of other polymer compositions is sufficiently low so as not to impede recyclability. In certain embodiments, the polyethylene-based films herein contain at least 90% by weight polyethylene homopolymers, copolymers, or terpolymers and less than 10% by weight other polymer compositions. In certain embodiments, the polyethylene-based films herein contain at least 95% by weight polyethylene homopolymers, copolymers, or terpolymers and less than 5% by weight other polymer compositions.

Figure 6:
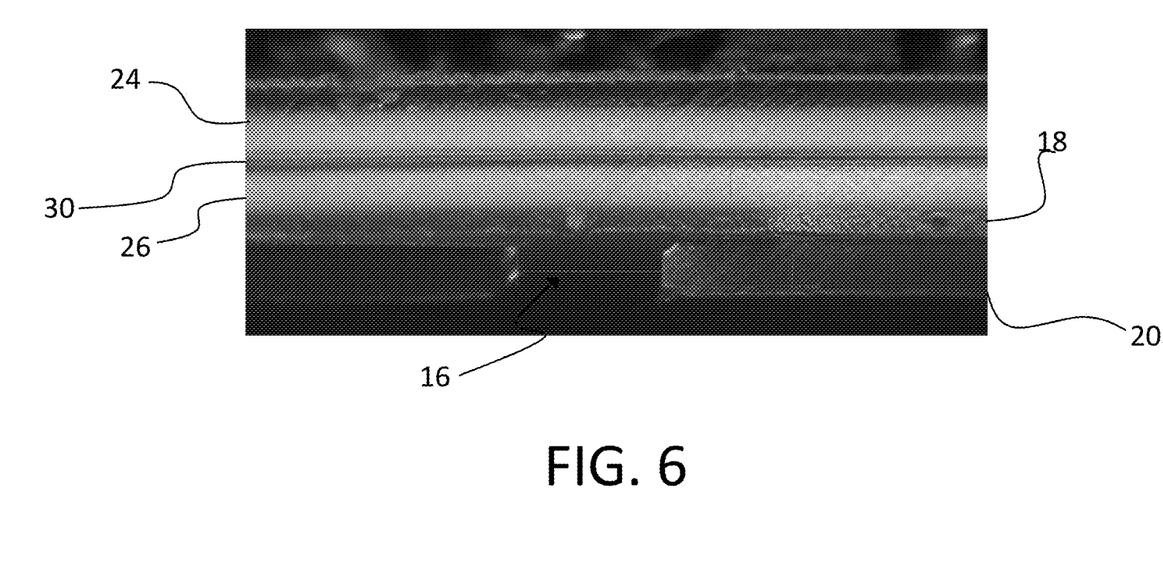
FIG. 6 is an image illustrating an exemplary film in accordance with the present invention having a mechanical slit line through the outer printed web only formed prior to lamination, wherein the inner ply providing sealant and barrier properties remains intact and untouched by the mechanical scoring, such that the clean slit through outer web provides excellent tear properties.
Figure 7:
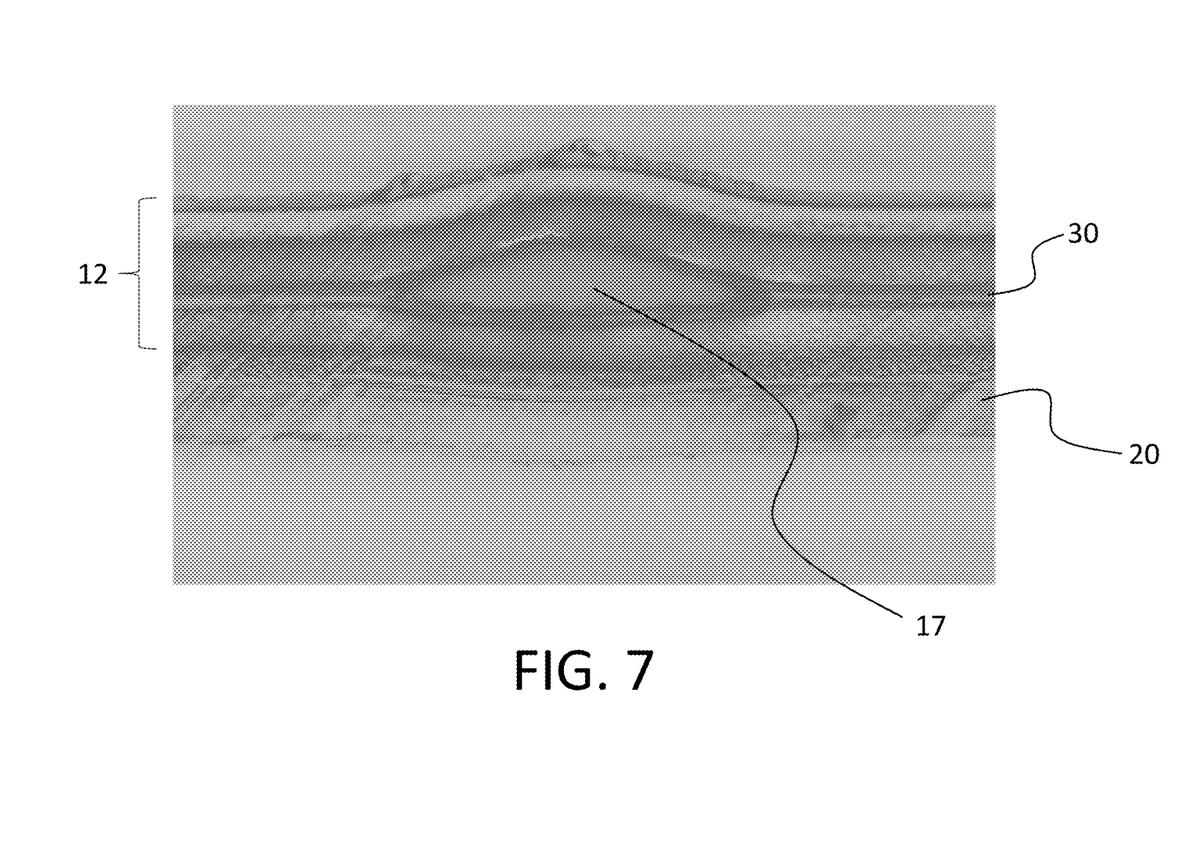
FIG. 7 is an image illustrating a film as shown in FIG. 6 except that it has been laser scored, wherein the laser penetrates through the barrier layer within the sealant web creating a void 17 in the barrier and thereby compromising the toughness, barrier, and tear properties of the film. It is clear the laser does not create a score line through the polyethylene because the laser has a greater affinity for ethyl vinyl alcohol (EVOH) versus polyethylene.

Recyclable polyethylene-based films with barrier properties are difficult to laser score due to the materials present in the barrier layer. The laser is attracted to these materials, thus breaching the barrier layer and diminishing the barrier properties of the original film, as seen in FIG. 7. This tendency makes laser scoring difficult to control. When laser scoring only the print web, the score does not go deep enough to create good tear properties. However, mechanical slitting of the preprinted outer web prior to laminating the outer web to the sealant web in accordance with the present disclosure allows complete penetration of the outer web to create excellent tear properties along the slit line in the laminated construction, but without any risk of breaching or penetrating into the barrier layer, as shown in FIG. 6. This results in a clean tear of the finished package and excellent moisture and gas permeation barrier properties to keep food packaged within the pouch palatable.

In embodiments, the film 10 is recyclable, has high barrier properties, is tough and able to withstand multiple drops, and can be readily torn open by the consumer. The strength required for this type of packaging application means machine direction oriented films (MDO) and biaxially oriented films (BOPE) cannot be used since they would not provide adequate drop resistance. In certain embodiments, the sealant film and print film used for the present lamination is configured to provide adequate toughness for a particular application, for example, for large format applications, packaging for dense products, and so forth. However, films that provide adequate toughness can make it difficult for the end consumer to tear without some type of scoring. Due to the need for moisture and oxygen permeation barrier properties, laser scoring cannot be used since laser scoring either breaches through the barrier layer as shown in FIG. 7, or, is too shallow and not deep enough to create good tear properties. Mechanically pre-slitting the outer web prior to laminating the outer web to the sealant web allows for more control, permitting the outermost print web layer to be perforated exclusively and allows for highly directional tear.

The illustrated film construction 10 includes a first polyethylene-based film or web material 12, which defines a sealant layer and is intended to be the inner layer in a packaging article 40 (see FIG. 4) formed and sealed from the film 10 to provide a sealed package enclosure. In embodiments, the sealant layer is a polyethylene-based film layer suitable for providing a hermetic seal, e.g., by heat and/or ultrasonic sealing, in a finished packaging article.

Figure 4:
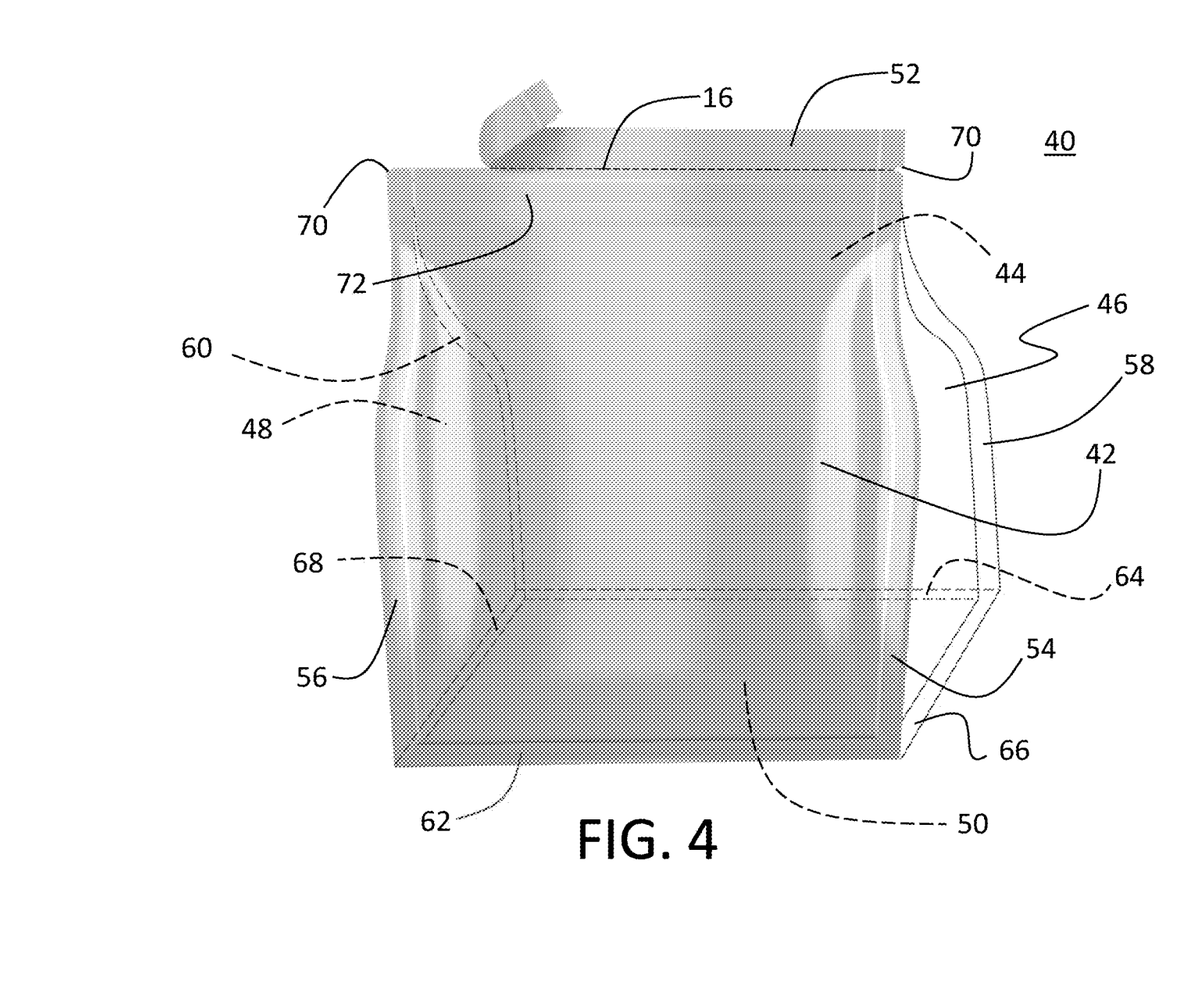
FIG. 4 is a perspective view of an exemplary packaging article formed of the packaging film laminations herein.

In the illustrated embodiment, the first layer 12 is laminated to a second polyethylene-based layer 14, which is intended to be an outer layer in the packaging article 40 that has been formed and sealed to provide a sealed package enclosing contents (not shown). Exemplary package contents include food items, pet food and treats, liquids, chemicals, health and beauty products, or other consumable and personal care product requiring protection from oxygen and moisture throughout the distribution channel environment and that can be contained in a flexible film pouch. In certain embodiments, the packaging article 40 is of a size that is configured to contain 2 or more pounds of contents, although it will be recognized that it is not limited to such.

The flexible film 10 may be of any suitable thickness for use on packaging equipment for forming sealed packaging and providing the requisite strength or toughness for the particular application. A mechanically formed slit 16 is formed in the outer layer 14 prior to being laminated to the first layer 12 to provide a line of preferential tearing in the finished packaging article 40.

Figure 2:
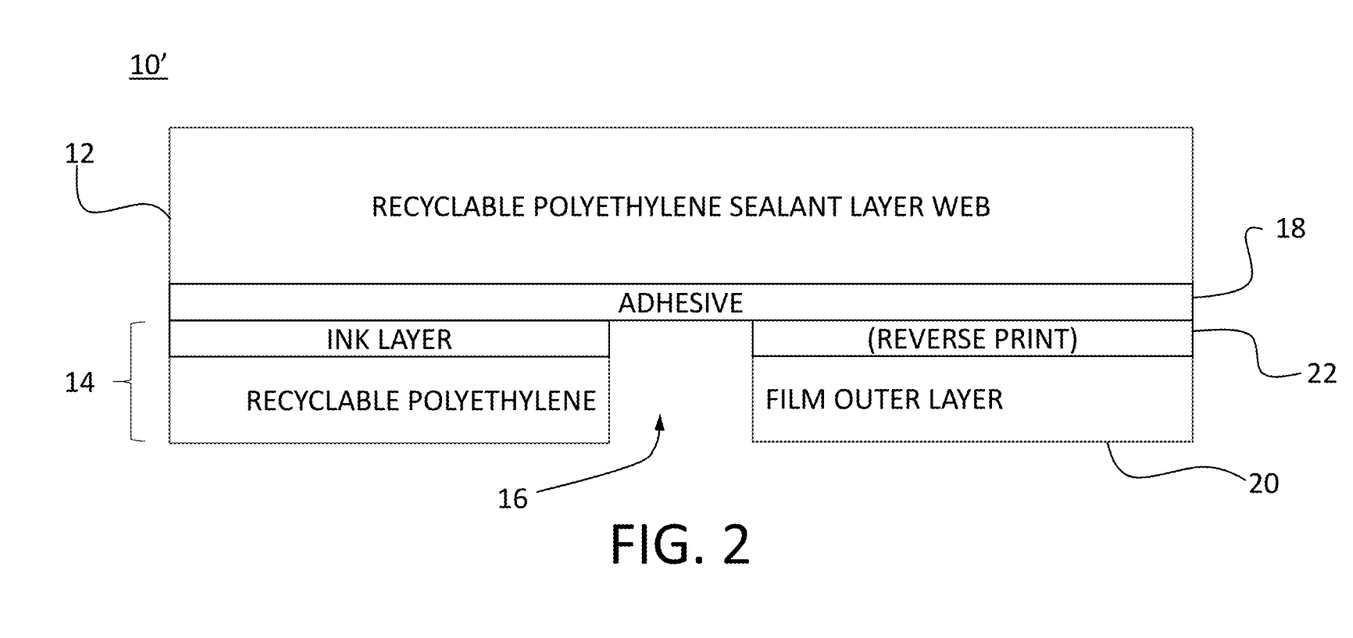

Referring now to FIG. 2, an exemplary packaging film structure 10' includes a first, inner film ply 12 laminated to the second, outer film ply 14. An adhesive layer 18 is interposed between the first film ply 12 and the second film ply 14 to form a laminated structure. The adhesive layer 18 may be formed of any suitable adhesive, including single component adhesives, two component adhesives, solvent-based adhesives, solventless adhesives, water-based adhesives, acrylic adhesives, extruded polyethylene or polypropylene adhesive systems, electron beam lamination adhesives, and UV lamination adhesives, as would be understood by persons skilled in the art.

The second film ply 14 is formed on an outer portion of the packaging film structure 10'. The film 14 includes a polyethylene-based film layer 20, which may be a monolayer or multilayer structure. Exemplary polyethylene polymers forming the film layer 20 include, for example, homopolymers, copolymers, and terpolymers of ethylene, high density polyethylene (HDPE), medium density polyethylene (MDPE), linear medium density polyethylene (LMDPE), low density polyethylene (LDPE), linear low density polyethylene (LLDPE), very low density polyethylene (VLDPE), and metallocene linear low-density polyethylene (mLLDPE).

A printed ink layer 22 is disposed on an inward facing surface of the polyethylene-based film layer 20, the printed surface being opposite the outermost surface. The printed ink layer 22 provides printed indicia intended to appear on the packaging structure 40 formed from the film structure 10'. Because the printed ink layer 22 is applied to the inward facing surface of the polyethylene-based film layer 20, the printed material is effected in a reverse printed format. The printed ink layer 22 can be applied to the inward facing surface of the polyethylene-based film 20 via any conventional printed method as would be understood by persons skilled in the art, including without limitation, using a rotogravure printing apparatus, flexographic printing apparatus, offset printing apparatus, ink jet printing apparatus, digital printing apparatus, or the like.

Figure 3:
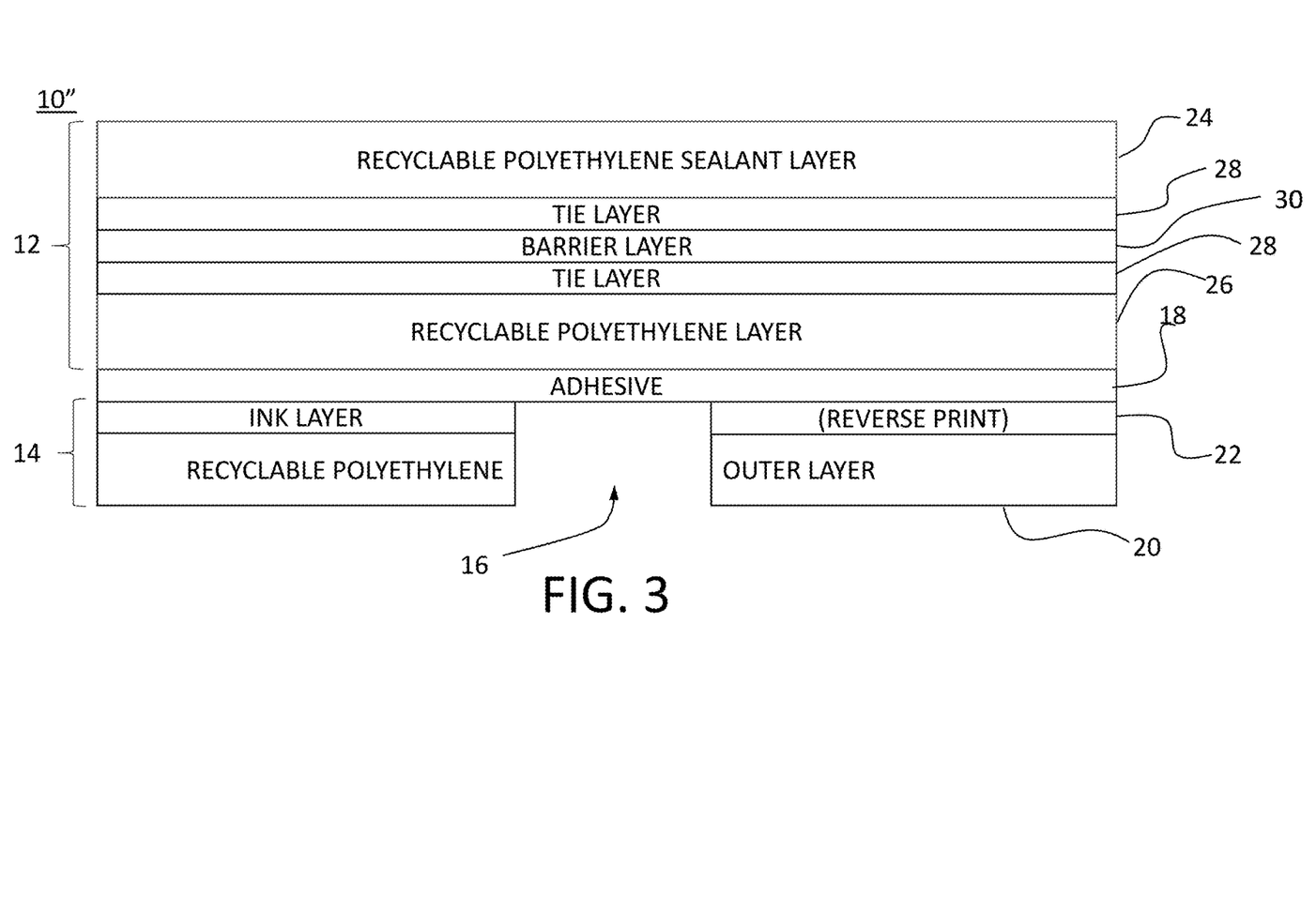

Referring now to FIG. 3, an exemplary packaging film structure 10" includes a first, inner film ply 12 laminated to the second, outer film ply 14. An adhesive layer 18 is interposed between the first film ply 12 and the second film ply 14 to form a laminated structure. The outer layer 14 and adhesive layer 18 may be as described above.

The illustrated film ply 12 is a five-layer polyethylene-based film structure comprising a barrier layer 30 disposed between two polyethylene layers 24. Tie layers 28 are disposed intermediate the barrier layer 30 and each of the polyethylene layers 24. Exemplary tie layers include maleic anhydride (MAH) or other tie resin or adhesion promotor as would be known by persons skilled in the art. Although a 5-layer multilayer film structure is shown, it will be recognized that other numbers of layers, including 7 layer, 9-layer, and others are also contemplated. Exemplary barrier layers 30 include polymer barrier layers such as ethylene-vinyl alcohol (EVOH) with or without compatibilizer additives. The multilayer film ply 12 appearing in FIG. 3 can be formed via a coextrusion process. In certain embodiments, the laminated film structure has an oxygen transmission rate (OTR) of less than 0.25 cc/100 in$^2$/24 hr (at 23° C. and 0% relative humidity), e.g., 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, and 0.25 cc/100 in$^2$/24 hr (at 23° C. and 0% relative humidity).

Figure 5:
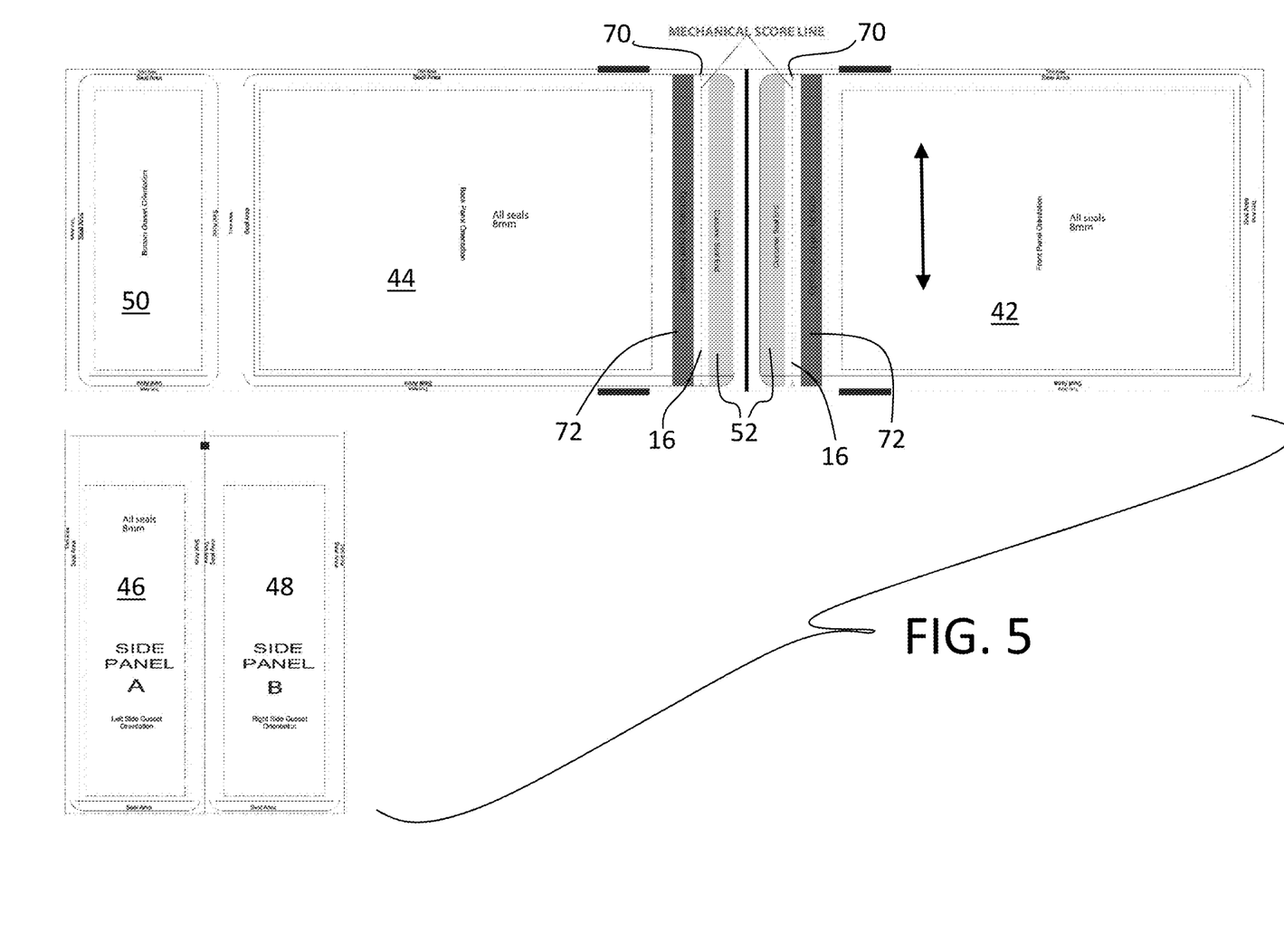
FIG. 5 is a die line drawing illustrating the manner of construction of the packaging article appearing in FIG. 4.

Referring now to FIGS. 4 and 5, wherein FIG. 4 shows a finished pouch and FIG. 5 shows a die line diagram showing the film 10 of the package 40 prior to being formed into the packaging article 40. In the illustrated embodiment, the packaging construction 40 defines a terminated side gusset pouch construction having a front panel 42 and a rear panel 44 opposite the front panel 42. Side panels 46 and 48 extend between the front and back panels 42, 44 on opposite transverse sides thereof. A bottom panel 50 is bounded by the front and back panels 42, 44 and the side panels 46, 48 to close the bottom of the pouch 40.

Unless indicated otherwise, all directional or positional terms used herein, such as "top," "bottom," "upper," "lower," "horizontal," "vertical," etc., and variations thereof refer to a direction or orientation relative to the packaging article 40 as it appears in FIG. 4. The terms "interior," "exterior," "inner", "outer", "inward," "outward," and variant forms thereof refer to directions or orientations relative to the interior and exterior of the packaging compartment defined by the packaging article 40.

The front and back panels 42, 44 are sealed along a transverse heat and/or ultrasonic seal region 52 along an upper edge of the packaging article 40. The front panel 42 and the side panel 46 are sealed along a generally vertical heat and/or ultrasonic seal region 54. The front panel 42 and the side panel 48 are sealed along a generally vertical heat and/or ultrasonic seal region 56. The rear panel 44 and the side panel 46 are sealed along a generally vertical heat and/or ultrasonic seal region 58. The rear panel 44 and the side panel 48 are sealed along a generally vertical heat and/or ultrasonic seal region 60. The front panel 42 and the bottom panel 50 are sealed along a generally horizontal transverse heat and/or ultrasonic seal region 62. The rear panel 44 and the bottom panel 50 are sealed along a generally horizontal transverse heat and/or ultrasonic seal region 64. The bottom panel 50 and the side panel 46 are sealed along a generally horizontal heat and/or ultrasonic seal region 66. The rear panel 44 and the bottom panel 50 are sealed along a generally horizontal heat and/or ultrasonic seal region 68.

The front panel 42 includes a slit line 16 in the outer ply of the film lamination, extending transversely near the upper end of the pouch 40 but below the heat and/or ultrasonic seal region 52. Likewise, the rear panel 42 includes a slit line 16 on the outer surface thereof, extending transversely near the upper end of the pouch 40 but below the heat and/or ultrasonic seal region 52. The front and rear lines 16 are in substantial alignment with each other. In certain embodiments, the score lines 16 are also in substantial alignment with at least one tear initiation feature 70. As used herein, the term "substantial alignment," and variants such as "substantially aligned," with respect to tear lines on the front and rear panels and any tear initiation feature means that the longitudinal offset between such elements, if any, is sufficiently small such that a tear initiated with the tear initiation feature will tend to propagate to both the front panel tear line 16 and the back panel tear line 16. In the illustrated embodiment, two tear initiation features 70, comprising a notch cut in each of the side seals. In certain embodiments, a tear initiation feature 70 is provided in only one of the side seals.

The tear lines 16 are formed by mechanically cutting through the outer polymer web material 14 prior to laminating to the sealant web 12. After laminating, this cut creates a line of reduced thickness that a tear initiated at the line 16, or the tear initiation feature 70, will be propagated along the lines 16 to reduce the tearing force required to open the package and thus allow the package to be opened in a controlled manner without the use of scissors or the need for incorporating a tear strip into the packaging article 40.

The tear lines 16 are mechanically cut, e.g., via knife, to create a transversely extending, mechanically weakened line of preferential tearing on the outer surface 14 of the film web 10 without penetrating the sealant and barrier layer 12. In certain embodiments, the thickness of the outer layer 14 ranges from 0.5 mil to 5 mil.

In certain embodiments, the flexible web material 10 is formed by laminating the slit outer layer to the sealant layer the web material 10 is stored in rolls prior to running the flexible web material on the packaging equipment. Alternatively, the outer web material may be slit on the production line and laminated to the sealant web during the packaging process.

In certain embodiments, the packaging article 40 includes a transversely extending fastener or closure 72 for allowing the end user to reclose the upper end of the packaging article 40 after it has been opened by tearing off the upper seal region 52 using the score lines 16. The closure 72 is disposed adjacent or near the upper end of the packaging article 40, below the score lines 16. Exemplary closure types include press to close fasteners, zipper type fasteners, hook and loop fasteners, and the like.

Figure 8:
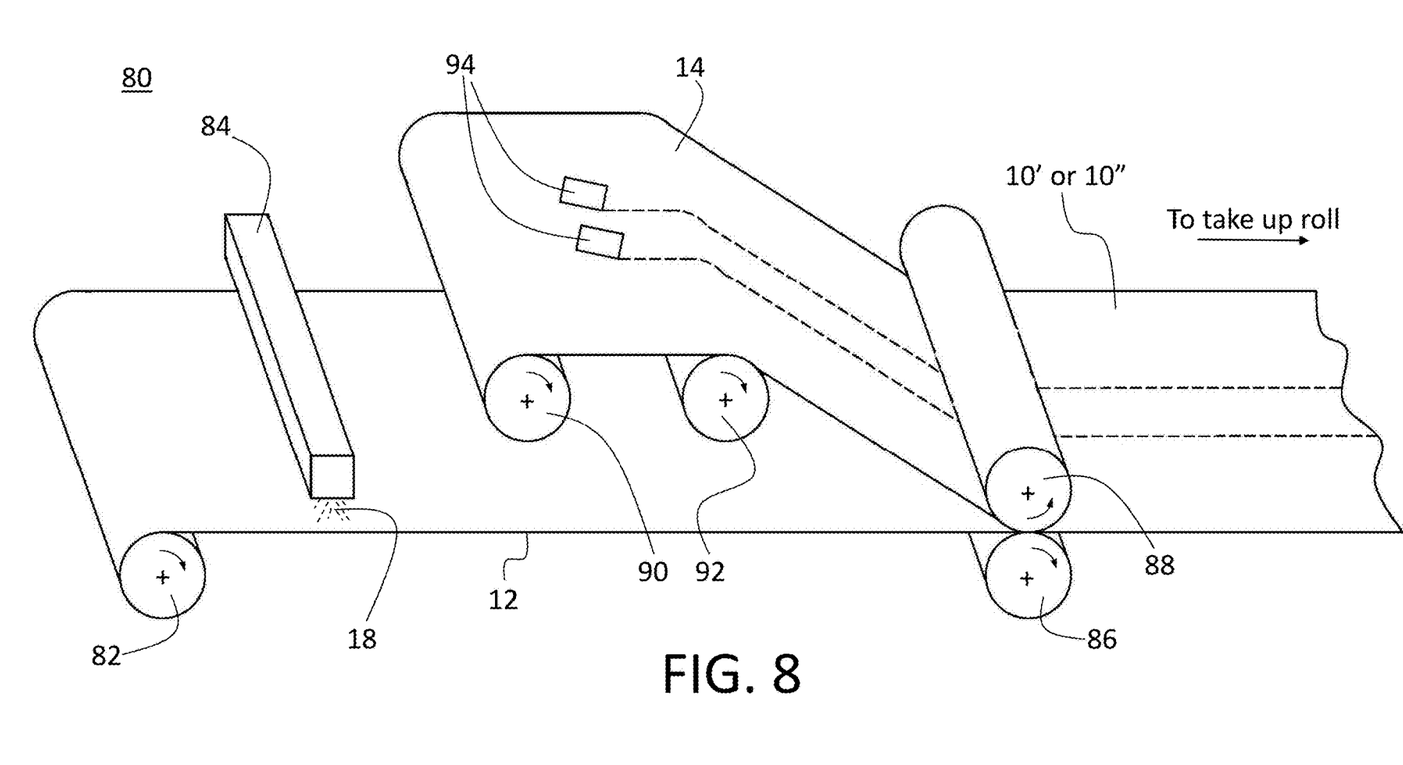
FIG. 8 is a schematic illustration of an exemplary process line which may be used to make or fabricate the packaging structures appearing in FIGS. 2 and 3.

Referring now to FIG. 8, there appears a process line 80 for making the packaging structures herein. The line 80 is suited for making the packaging structure 10' or 10", as described above.

The line 80 includes a substrate 12 comprising a recyclable polyethylene sealant layer and one or more additional layers as described above, which is fed in a machine direction from a substrate roll 82. The substrate 12 is fed past a coater 84 which coats the substrate 12 with an adhesive. The coater may be any suitable coater for applying the laminating adhesive, such as a spray coater, knife coater (e.g., knife-over-roll), roll coater, slot die coater, and the like. The adhesive coated substrate is then fed to a nip point occurring between nip rollers 86 and 88.

The outer layer 14 comprising the recyclable polyethylene layer 20 and a printed ink layer 22, including any associated varnishes or over lacquers, is fed from a feed roll 90 over a support roller 92 and to the nip of the rollers 86, 88. In embodiments, the ink layer 22 is reverse printed and is disposed on the surface facing the substrate 12. The illustrated process line 80 contemplates preprinting the outer web layer 20 with the ink layer 22 in a prior set. However, it will be recognized that the ink layer 22 could also be performed in the process line 80 by adding a printing section prior to the adhesive coating section.

In embodiments, the ink layer 22 may be omitted from the sealant web 12. In embodiments, the ink layer 22 is replaced with a forward printed ink layer disposed on the upward facing (in the orientation of FIG. 8) surface of the sealant layer web 12.

A slitter comprising one or more knives or slitting blades 94 are disposed intermediate the feed roll 90 and the support roller 92 for creating one or more longitudinal slits 16 extending in the machine direction. The slits 16 are formed by mechanically perforating the entire thickness of the outer layer web 14, which results in a line of preferential tearing in the film structure. The slitter may comprise a razor-in-air slitter, razor in grooved roll slitter, rotary knife shear slitter, and so forth. After exiting the nip point between the rollers 86 and 88, the packaging material 10' or 10" is wound up on a product wind-up roll (not shown). In preferred embodiments, the longitudinal slits 16 are continuous. In alternative embodiments, the slitter is configured to form a plurality of perforations along the line of preferential tearing.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A method of forming a flexible packaging film, comprising:
    providing a first web including a polymer sealant layer, the first web having a first major surface and a second major surface opposite the first major surface;
    providing a second web including a polymer outer layer, the second web having a third major surface and a fourth major surface opposite the third major surface;
    applying an adhesive layer to the second major surface;
    laminating the first web to the third major surface; and
    prior to said laminating, forming one or more continuous and uninterrupted slits extending in a machine direction in the second web, each of said one or more slits completely penetrating the second web.

2. The method of claim 1, wherein said applying an adhesive comprises feeding the first web in the machine direction past a coater.

3. The method of claim 2, wherein the coater is selected from the group consisting of a spray coater, knife coater, roll coater, and slit die coater.

4. The method of claim 2, wherein said laminating comprises feeding the first web and second web to a nip point occurring between a pair of nip rollers.

5. The method of claim 2, wherein each of the one or more slits extends in the machine direction.

6. The method of claim 2, wherein the one or more slits includes a first slit and a second slit, wherein the first and second slits are configured to be substantially aligned with each other in a packaging article formed from the flexible packaging film.

7. The method of claim 1, wherein the second web includes a printed ink layer disposed on the third major surface.

8. The method of claim 7, wherein the printed ink layer is a reverse printed ink layer.

9. The method of claim 1, wherein the one or more slits are formed using a slitter selected from the group consisting of a razor in air slitter, razor in grooved roll slitter, and a rotary knife shear slitter.

10. The method of claim 1, wherein the polymer sealant layer is a recyclable polyethylene sealant layer and the polymer outer layer is a recyclable polyethylene outer layer.

11. A method of forming a packaging article, comprising:
    providing a first web including a polymer sealant layer, the first web having a first major surface and a second major surface opposite the first major surface;
    providing a second web including a polymer outer layer, the second web having a third major surface and a fourth major surface opposite the third major surface;
    applying an adhesive layer to the second major surface;
    laminating the first web to the third major surface to form a laminated flexible packaging film;
    prior to said laminating, forming one or more continuous and uninterrupted slits extending in a machine direction in the second web, each of said one or more slits completely penetrating the second web; and
    sealing a first portion of the first major surface to a second portion of the first major surface to form a hermetically sealed packaging article, wherein the one or more slits form a line of preferential tearing for opening the packaging article.

12. The method of claim 11, wherein the sealant layer is heat and/or ultrasonic sealable to itself or a like sealant layer.

13. The method of claim 11, wherein the packaging article comprises:
    a body having a front panel, a back panel opposing the front panel, and a bottom panel adjoining the front, back, first side, and second side panels at a bottom end of the body;
    the front panel and back panel sealed along a top end of the body opposite the bottom end, the body having a longitudinal axis passing through the top and bottom ends, and wherein the front panel, back panel, and bottom panel enclose an interior;
    the front panel, back panel, and bottom panel each formed of the laminated flexible packaging film;
    the one or more slits defining a first line of preferential tearing extending transversely across the front panel adjacent the top end;
    the one or more slits further defining a second line of preferential tearing extending transversely across the back panel adjacent the top end, wherein the second score line is substantially aligned with the first score line along the longitudinal axis.

14. The method of claim 13, wherein the packaging article further comprises a first side panel intermediate the front and back panels on a first transverse side of the body and a second side panel intermediate the front and back panels on a second transverse side of the body.

15. The method of claim 14, wherein the polymer sealant layer is a recyclable polyethylene sealant layer and the polymer outer layer is a recyclable polyethylene outer layer.

16. The method of claim 11, wherein the polymer outer layer includes a moisture and oxygen permeation barrier.

17. The method of claim 16, wherein the barrier is formed of EVOH and the laminated flexible packaging film has an oxygen transmission rate (OTR) in the range of between 0.05 cc/100 in$^2$/24 hr and 0.25 cc/100 in$^2$/24 hr at 23° C. and 0% relative humidity.

18. The method of claim 17, wherein the first web includes a first polyethylene-based layer attached to an inward facing surface of the first web, a second polyethylene-based layer forming an innermost surface of the laminated flexible packaging film, and a barrier layer disposed intermediate the first and second polyethylene-based layers.

19. The method of claim 18, wherein the first web further includes a first tie layer disposed intermediate the first polyethylene-based layer and the barrier layer and a second tie layer disposed intermediate the second polyethylene-based layer and the barrier layer.

20. A flexible packaging film formed by the method of claim 1.

* * * * *